US007756982B2

(12) United States Patent
Johnson

(10) Patent No.: US 7,756,982 B2
(45) Date of Patent: *Jul. 13, 2010

(54) METHOD, SYSTEM AND PROGRAM PRODUCT FOR ASYNCHRONOUSLY PROCESSING REQUESTS

(75) Inventor: David Phillip Johnson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 9 days.

This patent is subject to a terminal disclaimer.

(21) Appl. No.: 12/034,426

(22) Filed: Feb. 20, 2008

(65) Prior Publication Data

US 2008/0140774 A1  Jun. 12, 2008

Related U.S. Application Data

(63) Continuation of application No. 10/632,073, filed on Jul. 31, 2003, now Pat. No. 7,349,968.

(51) Int. Cl.
*G06F 15/16* (2006.01)
(52) U.S. Cl. ...................... 709/227; 709/223
(58) Field of Classification Search ................ 709/227, 709/223, 226; 711/133, 134, 137
See application file for complete search history.

(56) References Cited

U.S. PATENT DOCUMENTS

| 5,845,074 | A | 12/1998 | Kobata |
| 6,026,424 | A | 2/2000 | Circenis |
| 6,055,564 | A | 4/2000 | Phaal |
| 6,070,184 | A | 5/2000 | Blount et al. |
| 6,157,941 | A | 12/2000 | Verkler et al. |
| 6,253,252 | B1 | 6/2001 | Schofield |
| 6,336,135 | B1 | 1/2002 | Niblett et al. |
| 6,351,771 | B1 | 2/2002 | Craddock et al. |
| 6,362,836 | B1 | 3/2002 | Shaw et al. |
| 6,687,792 | B2 | 2/2004 | Beyda |
| 6,766,422 | B2 | 7/2004 | Beyda |

(Continued)

OTHER PUBLICATIONS

IBM China IP Law, Information Disclosure Statement, Oct. 31, 2008, People's Republic of China, 1 page.

(Continued)

*Primary Examiner*—Krisna Lim
(74) *Attorney, Agent, or Firm*—Jeanine S. Ray-Yarletts, Esq.; Steven M. Greenberg, Esq.; Carey, Rodriguez, Greenberg & Paul, LLP

(57) ABSTRACT

Under the present invention, a request for a Uniform Resource Locator (URL) is received from a client on a server. Upon receipt, a corresponding session object is obtained, and a response identifier is generated. Based on the response identifier, it is determined whether the URL was previously requested by the client. If not, generation of a final response begins. As the response is being generated, a response refresh header is generated and returned to the client with a temporary response. The response refresh header contains a time value for causing the client to automatically send a subsequent request for the URL. After generation of the final response is complete, it is stored in a cache according to the response identifier. Then, when the subsequent request is received from the client, the final response is retrieved from the cache and served to the client.

12 Claims, 3 Drawing Sheets

U.S. PATENT DOCUMENTS

| | | | |
|---|---|---|---|
| 7,051,161 | B2 | 5/2006 | Dixit et al. |
| 7,076,544 | B2 | 7/2006 | Katz et al. |
| 7,349,968 | B2 * | 3/2008 | Johnson ............... 709/227 |
| 2002/0099795 | A1 | 7/2002 | Betros et al. |
| 2002/0135612 | A1 | 9/2002 | Royer et al. |
| 2003/0225885 | A1 | 12/2003 | Rochberger et al. |

OTHER PUBLICATIONS

What's New in EAServer 4.1.1, http:—manuals.sybase.com-onlinebooks-group-eag-eag0411e-new411-@Generic_BookTe...-84, Feb. 14, 2003, pp. 1-9.

Kahol et al., "A Strategy to Manage Cache Consistency in a Disconnected Distributed Environment", IEEE Transactions on Parallel and Distributed Systems, vol. 12, No. 7, Jul. 2001, pp. 686-700.

Schilit et al., "Tele Web: Loosely Connected Access to the World Wide Web", Fifth International World Wide Web Conference, May 6-10, 1996, Paris, France, pp. 1-16.

Chang et al., "Web Browsing in a Wireless Environment: Disconnected and Asynchronous Operation in ARTour Web Express", MOBICOM 97, Budapest Hungary, pp. 260-269.

"Persistent Context for World Wide Web Browsers," Feb. 1, 1997, pp. 215-216, IBM Technical Disclosure Bulletin, IBM Corp., vol. 40, No. 2, NY, XP000692225.

* cited by examiner

METHOD, SYSTEM AND PROGRAM PRODUCT FOR ASYNCHRONOUSLY PROCESSING REQUESTS

REFERENCE TO PRIOR APPLICATIONS

This application is a continuation application of U.S. patent application Ser. No. 10/632,073, filed on Jul. 31, 2003, now U.S. Pat. No. 7,349,968, which is hereby incorporated by reference.

BACKGROUND OF THE INVENTION

1. Field of the Invention

The present invention generally relates to a method, system and program product for asynchronously processing requests. Specifically, the present invention allows network-based requests (e.g., web requests) to be processed by an application server without maintaining a constant connection with a client.

2. Related Art

As use of the Internet becomes more popular, web users are increasingly relying on the world wide web as a source of information. In a typical implementation, a user will operate a web browser on a client, and submit a "request" for a particular web page to a server. One or more "servlets" (or the like) on the server will process the request and return the appropriate web page to the browser. To this extent, one specific technology that is gaining widespread use is the concept of web portal pages. In general, web portal pages provide a mechanism for a user to receive targeted and personalized content. Typically, a portal page includes sections or visual portlets that each contain particular portal content that is selected and formatted according to a user's preferences. For example, a user could establish his/her own portal page that has sections for news, weather and sports. When the portal page is requested, a portal program on the server would obtain the desired content from the appropriate content providers. Once obtained, the portal content would be aggregated, and then displayed in the appropriate sections as a web portal page. This technology has lead to the explosion of personalized "home" pages for individual web users.

Unfortunately, in each of these instances, the handling of a request and response is done synchronously. That is, a request is sent to the server, and the connection between the client and server is maintained until the response is returned. Maintaining a connection in this manner could not only limit or prevent the client's capability to perform other tasks, but it also could limit or prevent the capability of the server to connect with other clients. This is especially the case where the response must be processed by servlets/portlets. For example, in the case of a portal page, creating a response to the request could require interfacing with numerous content sources. As such, creation of the response could take several seconds. If the connection between the client and server is maintained for this entire time, the above-indicated problems could arise.

As known in the art, under the Hypertext Transfer Protocol (HTTP), a server cannot generally initiate a connection with a client. Rather, the client must initiate a connection with the server. Accordingly, if the connection between the client and server is terminated while a request is being processed, only the client can initiate a new connection to receive the response. Currently, no existing technology allows for the connection between the client and server to be terminated as the request is being processed, while not requiring deliberate/manual modification of the client to reestablish the connection at a later time.

In view of the foregoing, there exists a need for a method, system and program product for asynchronously processing requests. Specifically, a need exists for a system that allows a connection between a client and a server to be terminated while a request from the client is being processed. A further need exists for the client to automatically establish a new connection with the server at a later time without requiring modification or deliberate action on the part of the client.

SUMMARY OF THE INVENTION

In general, the present invention provides a method, system and program product for asynchronously processing requests. Specifically, under the present invention, a request for a Uniform Resource Locator (URL) is received from a client on a server. Upon receipt, a corresponding session object is obtained, and a response identifier is generated. Based on the response identifier, it is determined whether the URL was previously requested by the client. If not, generation of a final response begins. As the response is being generated, a response refresh header is generated and returned to the client with a temporary response. The response refresh header contains a time value for causing the client to automatically send a subsequent request for the URL. After generation of the final response is complete, it is stored in a cache according to the response identifier. Then, when the subsequent request is received from the client after expiration of the time value in the response refresh header, the final response is retrieved from the cache based on the response identifier, and served to the client.

A first aspect of the present invention provides a method for asynchronously processing requests, comprising: receiving a request for a Uniform Resource Locator (URL) from a client, and obtaining a session object corresponding to the request; generating a response identifier based on a session identifier and the URL; determining if the URL was previously requested by the client based on the response identifier; generating a response refresh header that includes a time value for causing the client to automatically send a subsequent request for the URL; and sending a temporary response to the request and the response refresh header to the client.

A second aspect of the present invention provides a method for asynchronously processing requests, comprising: receiving a request for a Uniform Resource Locator (URL) from a client, and obtaining a session object corresponding to the request; generating a response identifier based on a session identifier and the URL; determining if the URL was previously requested by the client based on the response identifier; checking a cache for a final response to the request based on the response identifier, if the URL was previously requested by the client; generating a response refresh header that includes a time value for causing the client to automatically send a subsequent request for the URL if the final response is not complete; and sending a temporary response to the request and the response refresh header to the client if the final response is not complete.

A third aspect of the present invention provides a system for asynchronously processing requests, comprising: an object system for obtaining a session object for a request for a Uniform Resource Locator (URL) received from a client; a response identifier system for generating a response identifier based on a session identifier and the URL; a request checking system for determining whether the URL was previously requested by the client; and a header generation system for generating a response refresh header that includes a time value for causing the client to automatically send a subsequent request for the URL.

A fourth aspect of the present invention provides a program product stored on a recordable medium for asynchronously processing requests, which when executed, comprises: program code for obtaining a session object for a request for a Uniform Resource Locator (URL) received from a client; program code for generating a response identifier based on a session identifier and the URL; program code for determining whether the URL was previously requested by the client; and program code for generating a response refresh header that includes a time value for causing the client to automatically send a subsequent request for the URL.

Therefore, the present invention provides a method, system and program product for asynchronously processing requests.

BRIEF DESCRIPTION OF THE DRAWINGS

These and other features of this invention will be more readily understood from the following detailed description of the various aspects of the invention taken in conjunction with the accompanying drawings in which.

Figure 1:
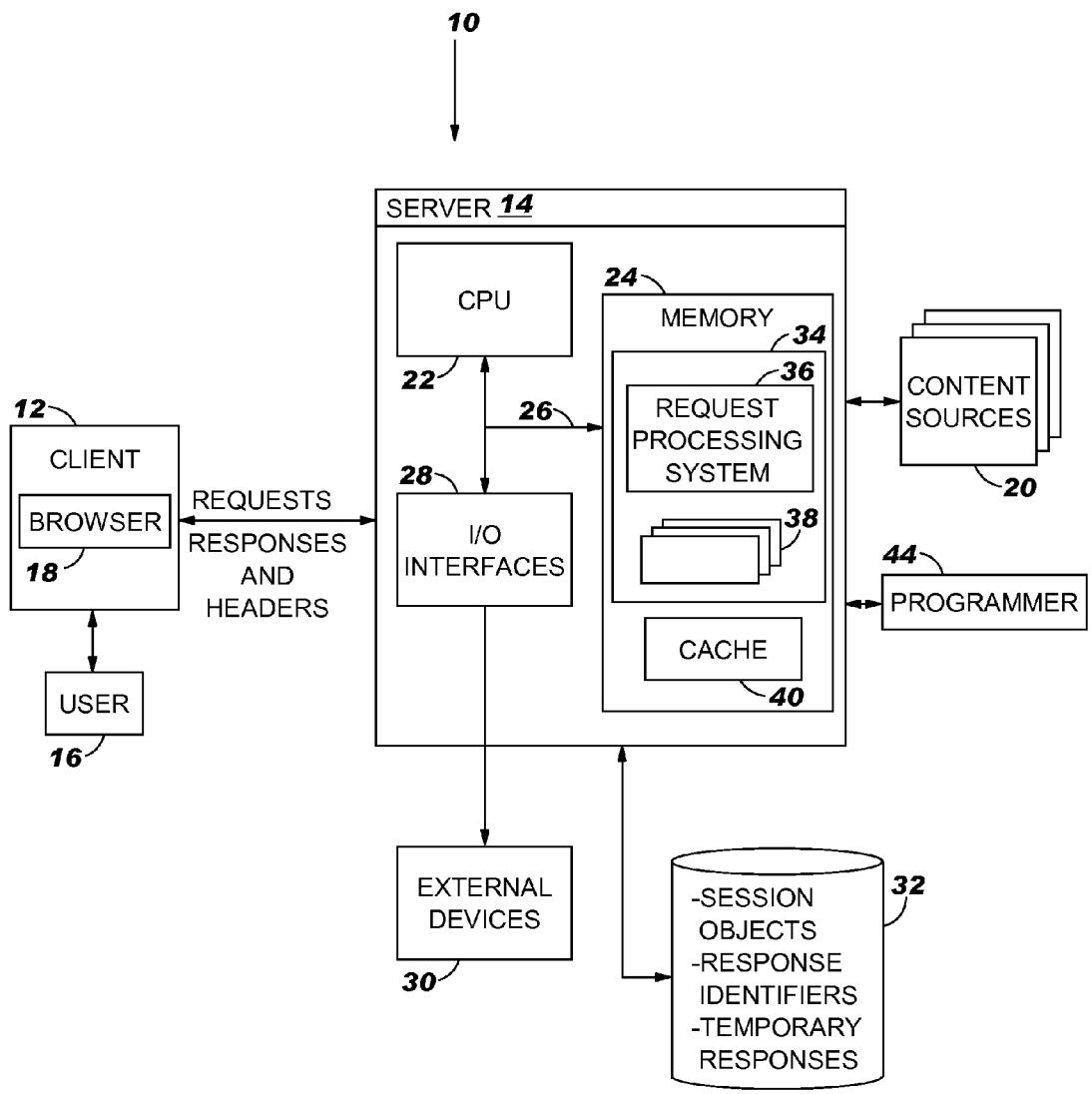
FIG. 1 depicts a system for asynchronously processing requests, according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for asynchronously processing requests. Specifically, under the present invention, a request for a Uniform Resource Locator (URL) is received from a client on a server. Upon receipt, a corresponding session object is obtained, and a response identifier is generated. Based on the response identifier, it is determined whether the URL was previously requested by the client. If not, generation of a final response begins. As the response is being generated, a response refresh header is generated and returned to the client with a temporary response. The response refresh header contains a time value for causing the client to automatically send a subsequent request for the URL. After generation of the final response is complete, it is stored in a cache according to the response identifier. Then, when the subsequent request is received from the client after expiration of the time value in the response refresh header, the final response is retrieved from the cache based on the response identifier, and served to the client. The teachings herein can thus be implemented in conjunction with all browsers/systems supporting Hypertext Transfer Protocol (HTTP).

It should be understood in advance that as used herein, the term "request" is intended to refer to a network-based request issued from a client to a server such as a web request. Typically, the request is for a particular Uniform Resource Locator (URL). To this extent, as will be further explained below, the request can be processed on the server by one or more servlets, portlets or the like.

Referring now to FIG. 1, a system 10 for asynchronously processing a request is shown. Under the present invention, client 12 and server 14 can represent any type of computerized systems. For example, client 12 and/or server 14 could be a personal computer, workstation, laptop, hand-held device, etc. In general, client 12 communicates with server 14 over a network. Moreover, as will be further described below communication between client 12 and server 14 can occur over any type of public network such as the Internet, or any type of private network such as a local area network (LAN), wide area network (WAN), a virtual private network (VPN), etc. In one embodiment, server 14 is an application server such as a portal server that delivers portal pages to client 12. In any event, a user 16 will operate a web browser 18 on client 12 to request a web page from a server 14. The server 14 will generate the web page (e.g., a final response to the request) by obtaining content from the various content sources 20. Once generated, the web page is sent back to the requesting client 12.

As shown, server 14 generally comprises central processing unit (CPU) 22, memory 24, bus 26, input/output (I/O) interfaces 28, external devices/resources 30 and storage unit 32. CPU 22 may comprise a single processing unit, or be distributed across one or more processing units in one or more locations, e.g., on a client and computer system. Memory 24 may comprise any known type of data storage and/or transmission media, including magnetic media, optical media, random access memory (RAM), read-only memory (ROM), a data cache 40, a data object, etc. Moreover, similar to CPU 22, memory 24 may reside at a single physical location, comprising one or more types of data storage, or be distributed across a plurality of physical systems in various forms.

I/O interfaces 28 may comprise any system for exchanging information to/from an external source. External devices/resources 30 may comprise any known type of external device, including speakers, a CRT, LCD screen, hand-held device, keyboard, mouse, voice recognition system, speech output system, printer, monitor/display, facsimile, pager, etc. Bus 26 provides a communication link between each of the components in server 14 and likewise may comprise any known type of transmission link, including electrical, optical, wireless, etc.

Storage unit 32 can be any system (e.g., a database) capable of providing storage for information under the present invention. Such information could include, among other things, session objects, response identifiers, temporary responses, etc. As such, storage unit 32 could include one or more storage devices, such as a magnetic disk drive or an optical disk drive. In another embodiment, storage unit 32 includes data distributed across, for example, a local area network (LAN), wide area network (WAN) or a storage area network (SAN) (not shown).

As indicated above, the teachings of the present invention are typically implemented in a network environment such as over the Internet, a wide area network (WAN), a local area network (LAN), a virtual private network (VPN), etc. To this extent, communication between client 12 and server 14 could occur via a direct hardwired connection (e.g., serial port), or via an addressable connection that may utilize any combination of wireline and/or wireless transmission methods. Server 14 and client 12 may utilize conventional network connectivity, such as Token Ring, Ethernet, WiFi or other conventional communications standards. Moreover, connectivity could be provided by conventional TCP/IP sockets-based protocol. In this instance, client 12 would utilize an Internet service provider to establish connectivity to server 14.

Shown in memory 24 is request processing system 36, servlets/portlets 38 and cache 40. In general, request processing system 36 allows a request from client 12 to be processed asynchronously, without requiring modification or action on the part of client 12 or browser 18. Further, it should be appreciated that request processing system 36 can include some or all of the components of current portal or application server programs. For example, request processing system 36 could incorporate components of WebSphere Application Server and/or WebSphere Portal Server, both of which are commercially available from International Business Machines, Corp. of Armonk, N.Y.

Figure 2:
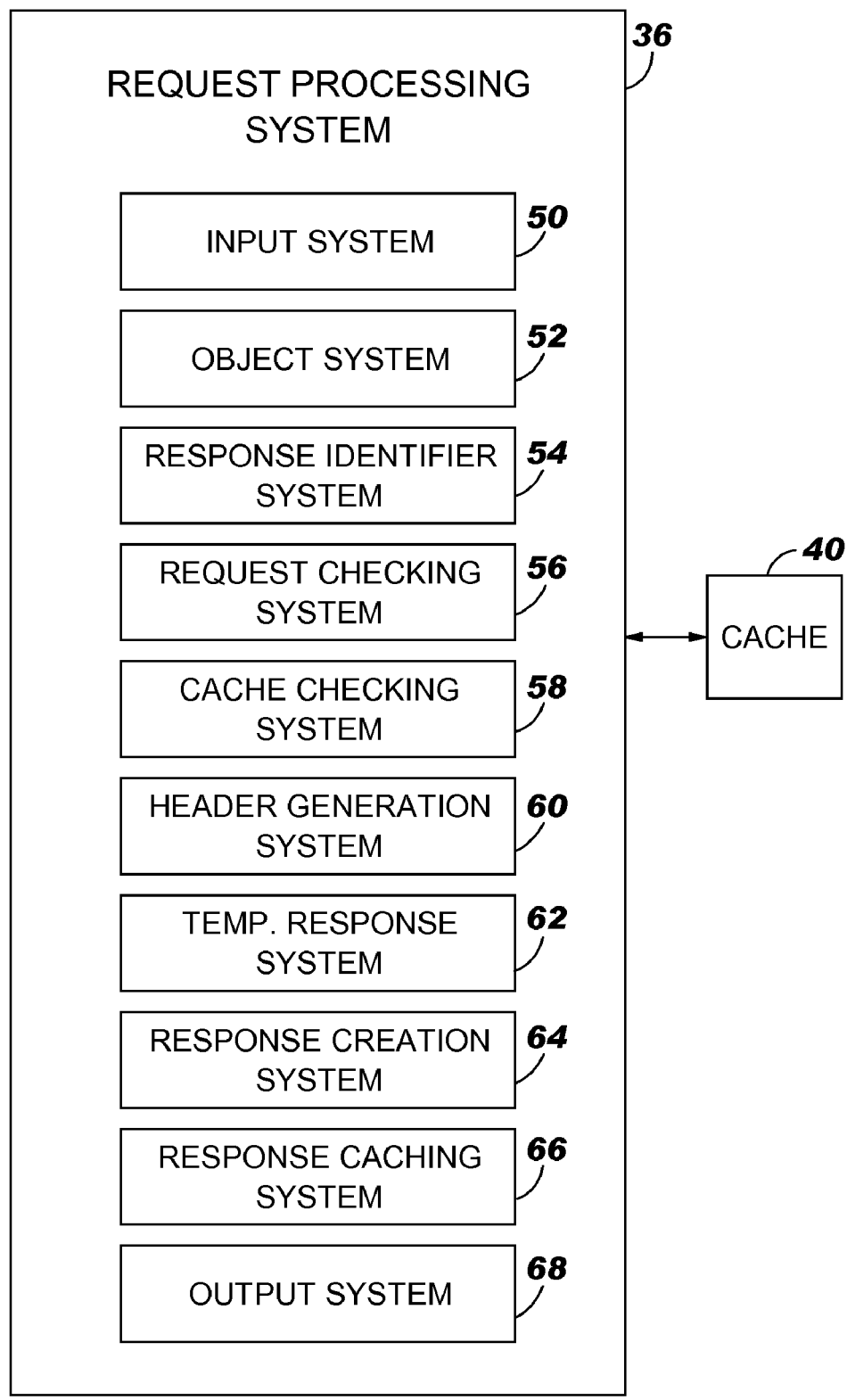
FIG. 2 depicts the request processing system of FIG. 1 in greater detail.

Referring to FIGS. 1 and 2 collectively, the teachings of the present invention will be described in greater detail. It should be understood in advance that the embodiment of request processing system 36 shown in FIG. 2 is intended to be illustrative only. As such, the subsystems thereof could be implemented as more or fewer subsystems. For example, input system 50 and output system 68 can be combined into a single "communication system." In any event, under the present invention, when a request is sent from client 12, it is received by input system 50. Upon receipt, object system 52 will obtain a session object corresponding to the session between client 12 and server 14. The session object typically sets forth, among other things, a session identifier corresponding to the session. If the session is a new session, object system 52 will create the session object and store the same in storage unit 32. Conversely, if the session was previously created, object system 52 can retrieve the session object from storage unit 32. Regardless, once the session object is obtained, response identifier system 54 will generate a response identifier. Typically, the response identifier includes the session identifier from the session object, and a hash of the Uniform Resource Locator (URL) that was requested. This allows it to reference both the particular session and the URL requested.

Once the response identifier is generated, request checking system 56 will determine whether the URL was previously requested by client 12. Specifically, request checking system 56 will access a "request" table in the session object. If the response identifier is listed therein, it means that the URL was previously requested by client 12. In this case, cache checking system 58 will check cache 40 to determine if a final response to the request is complete. In general, final responses to requests are cached by response caching system 66 according to the response identifier. Accordingly, cache checking system can check cache 40 for a matching response identifier. If the final response is complete, it is returned to client 12 via output system 68.

However, if request checking system 56 determines the response identifier is not listed in the request table of the session object (i.e., the URL was not previously requested by client 12), it will communicate the request with an instruction to response caching system 66. The instruction indicates that the final response to the request is to be stored in cache 40 according to the response identifier. On or around the same time, response creation system 64 will commence generation of a final response. In a typical embodiment, response creation system 64 will call one or more servlets/portlets 38 (FIG. 1) that will obtain the corresponding content from content sources 20. To this extent, servlets/portlets 38 could include standard or remote portlets (e.g., Web Services for Remote Portals), while content sources 20 could include independent organizations, data structures, storage units, etc. In any event, as the final response is being generated, header generation system 60 will generate a response refresh header that includes a time value for causing client 12 to automatically send a subsequent request for the same URL. The time value can be established by programmer 44 (FIG. 1) and is approximately the amount of time that it will take to create the final response. For example, if a final response to this request generally takes ten seconds to generate and return, the time value in the response refresh header can be eleven seconds. This allows the connection between client 12 and server 14 to be terminated while the final response is being generated.

The response refresh header is returned to the client by output system 68 along with a temporary response that is generated by temporary response system 62. Similar to the time values, the temporary response is definable by programmer 44. For example, the temporary response could be a page that states "Request is Being Processed." Once the final response is complete, response caching system 66 will store it in cache 40 according to the response identifier so that it can be easily cross-referenced.

Client 12 will receive the temporary response and response refresh header in browser 18. After expiration of the time value in the response refresh header, browser 18 will automatically send a subsequent request for the URL to server 14. Specifically, under HTTP, browser 18 can be configured to handle and process headers such as the response refresh header of the present invention to automatically generate and send a request without any deliberate or manual action on the part of user 16. Accordingly, the response refresh header allows the request process to be asynchronous, without any modification of client 12 or browser 18.

The subsequent response is received by input system 50. Similar to the previous request, object system 52 will obtain the corresponding session object. Since this is a subsequent response, the session object should already exist. Accordingly, object system 52 can retrieve the same from storage unit 32. After obtaining the session object, the response identifier is regenerated by response identifier system 54. As indicated above, the response identifier includes the session identifier and a hash of the requested URL. Using the response identifier, request checking system 56 will determine whether the URL was previously requested. Specifically, request checking system 56 will check the request table in the session object. Since the URL was requested previously by client 12, the response identifier should be listed in the request table. Accordingly, cache checking system 58 will check cache 40 to determine if the final response is complete. Specifically, cache checking system 58 will check for the final response using the response identifier. If the final response is complete, it is retrieved from cache 40 by cache checking system 58 and sent to client 12 via output system 68 for display in browser 18. However, if the final response is not yet complete, header generation system 60 will generate a new response refresh header with a time value. The time value can be the same as in the previous response refresh header, or it could be a new different time. In any event, the new response refresh header is sent to client 12 via output system 68 with a new temporary response. After expiration of the time value in the new response refresh header, client 12 will submit another request for the URL, which will be processed in a similar manner.

Figure 3:
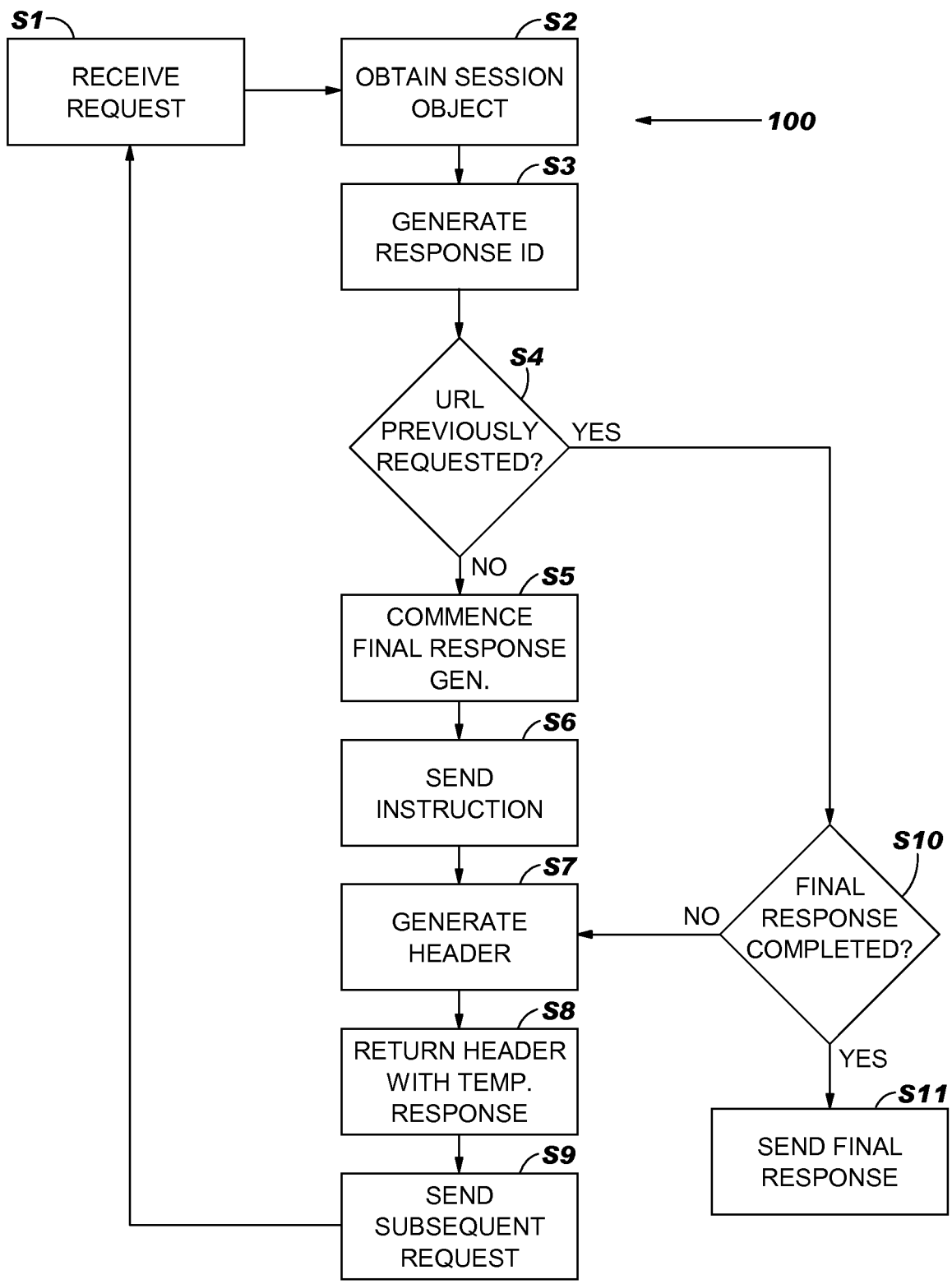
FIG. 3 depicts a method flow diagram, according to the present invention.

Referring now to FIG. 3, a flow diagram 100 of the present invention is shown. As depicted, a request for a URL is received in step S1. In step S2, a session object is obtained, and in step S3 a response identifier is generated. In step S4, it is determined whether the URL was previously request by the client based on the response identifier. If the URL was not previously requested, generation of a final response is commenced in step S5. In step S6, an instruction is passed with the request to the response caching system to store the final response, when complete, in the cache according to the response identifier. As the final response is being generated, a response refresh header is generated in step S7. The response refresh header is returned to the client along with a temporary response in step S8.

After expiration of the time value in the response refresh header, the client will send a subsequent request for the URL in step S9. Upon receipt in step S1, steps S2-S4 will be repeated. Specifically, the session object will be obtained, the response identifier will be generated, and it will be determined whether the URL was previously requested by the client. Since the URL was previously requested by the client, the cache will be checked in step S10 to determine whether the final response to the request is complete. If so, the final response is retrieved from the cache and returned to the client in step S11. If the final response is not yet complete, a new response refresh header will be generated in step S7 and returned to the client with a new temporary response in step S8. The process can continue to repeat until the final response is returned to the client.

It should be understood that the present invention can be realized in hardware, software, or a combination of hardware and software. Any kind of computer/computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A method for asynchronously processing requests, comprising:
   obtaining a session object for a request for a Uniform Resource Locator (URL) received from a client;
   generating a response identifier based on a session identifier and the URL;
   determining if the URL was previously requested in the request by the client based on the response identifier;
   generating a response refresh header that includes a time value for causing the client to automatically send a subsequent request for the URL; and
   sending a temporary response to the request and the response refresh header to the client.

2. The method of claim 1, further comprising sending the request to a response caching system with an instruction to cache a final response to the request according to the response identifier.

3. The method of claim 1, wherein the request is a web request.

4. The method of claim 1, wherein the response identifier comprises the session identifier and a hash of the URL.

5. The method of claim 1, further comprising:
   determining if a final response to the request is complete, prior to the generating step; and
   sending the final response to the client if the final response is complete, wherein the refresh header is not generated and sent to the client with the temporary response if the final response is complete.

6. The method of claim 1, further comprising:
   commencing generation of a final response to the request; and
   storing the final response in a cache according to the response identifier when the final response is complete.

7. The method of claim 6, further comprising:
   receiving a subsequent request for the URL from the client after expiration of the time value in the response refresh header;
   obtaining the session object;
   generating the response identifier;
   determining whether the URL was previously requested based on the response identifier;
   checking the cache for the final response to request based on the response identifier; and
   sending the final response to the client if the final response complete, wherein a new refresh header is generated and sent to the client with a new temporary response if the final response is not complete.

8. The method of claim 1, wherein the determining step comprises checking a table in the session object for the response identifier to determine if the URL was previously requested by the client.

9. A method for asynchronously processing requests, comprising:
   obtaining a session object for a request for a Uniform Resource Locator (URL) received from a client;
   generating a response identifier based on a session identifier and the URL;
   determining if the URL was previously requested in the request by the client based on the response identifier;
   checking a cache for a final response to the request based on the response identifier, if the URL was previously requested by the client;
   generating a response refresh header that includes a time value for causing the client to automatically send a subsequent request for the URL if the final response is not complete; and
   sending a temporary response to the request and the response refresh header to the client if the final response is not complete.

10. The method of claim 9, wherein the response identifier comprises the session identifier and a hash of the URL.

11. The method of claim 9, wherein the determining step comprises checking a table in the session object for the response identifier to determine if the URL was previously requested by the client.

12. The method of claim 9, further comprising:
   generating the final response; and
   caching the final response in the cache according to the response identifier, prior to the checking step.

* * * * *